United States Patent

Sauer

Patent Number: 5,867,129
Date of Patent: Feb. 2, 1999

[54] AUTOMOBILE WINDSHIELD INCLUDING AN ELECTRICALLY CONDUCTING LAYER

[75] Inventor: Gerd Sauer, Solberg/Venwegen, Germany

[73] Assignee: Saint-Gobain Vitrage, Courbevoie, France

[21] Appl. No.: 937,598

[22] Filed: Sep. 29, 1997

Related U.S. Application Data

[63] Continuation of Ser. No. 598,210, Feb. 7, 1996, abandoned.

[30] Foreign Application Priority Data

Feb. 7, 1995 [DE] Germany ............. 195 03 892.4

[51] Int. Cl.$^6$ ........................................ H01Q 1/02
[52] U.S. Cl. ..................... 343/713; 343/704; 343/767
[58] Field of Search ........................ 343/713, 704, 343/909, 767, 711, 768; 428/155, 172, 209, 213; H07Q 1/02, 15/00

[56] References Cited

U.S. PATENT DOCUMENTS

| | | | |
|---|---|---|---|
| 4,656,487 | 4/1987 | Sureau et al. | 343/909 |
| 4,851,858 | 7/1989 | Frisch | 343/909 X |
| 5,012,255 | 4/1991 | Becker | 343/713 X |
| 5,208,603 | 5/1993 | Yee | 343/909 |
| 5,311,202 | 5/1994 | Popp et al. | 343/909 |
| 5,364,685 | 11/1994 | Nakashima et al. | 343/909 X |

*Primary Examiner*—Don Wong
*Assistant Examiner*—Tho Phan
*Attorney, Agent, or Firm*—Oblon, Spivak, McClelland, Maier & Neustadt, P.C.

[57] ABSTRACT

An automobile windshield covered with a transparent electrically conducting layer, on which some hollowed spaces are provided in the form of slots. The length of these slots is a function of the wavelength of the microwave radiation. The microwave radiation, as used for transmission of information in portable telephone sets or remote surveillance systems of toll roads, for example, is absorbed by the conducting layer to again be retransmitted by the slots which act as antennas. In this manner, vehicle windshields which are provided with an electrically conducting layer which reflects the infrared can allow microwave radiation to pass through.

9 Claims, 2 Drawing Sheets

AUTOMOBILE WINDSHIELD INCLUDING AN ELECTRICALLY CONDUCTING LAYER

This application is a Continuation of application Ser. No. 08/598,210, filed on Feb. 7, 1996, now abandoned.

BACKGROUND OF THE INVENTION

1. Field of the Invention

The invention pertains to a windshield that includes a transparent electrically conducting layer, the windshield comprising at least one part of an enclosure within which an antenna for receiving or transmitting microwave radiation is located. The windshield can be an automobile windshield covered by a layer which reflects infrared radiation.

2. Description of the Related Art

Windshields which are provided with an electrically conducting layer with low impedance are used as insulating windshields and/or as electrically heated windshields in the construction industry as well as in the automobile industry. With respect to automobiles, this type of windshield, combined with a casing made of metal, comprises a Faraday cage which isolates the interior of the vehicle from electromagnetic fields: in the construction industry, the use of windows covered by an electrically conducting layer also allows one to electrically isolate rooms when equipping the other walls in an adequate manner. This kind of insulation can also guarantee the protection of sensitive installations such as control consoles against disturbances caused by powerful radio transmitters or radar equipment.

Such electrical insulation, which can be extended to windshields, prevents transmission of electromagnetic radiation in the microwave range. It follows that one cannot use a portable telephone in a vehicle equipped with this type of window. This presents considerable problems if one wishes to install vehicle research and positioning systems, remote control, identification and remote toll devices, or if the transmitter or receiver is located with the antenna inside the vehicle.

SUMMARY OF THE INVENTION

It is an object of this invention is to provide a window with an electrically conducting layer which, while shielding against electromagnetic radiation of long wavelengths and reflecting infrared radiation, allows microwaves to pass through.

According to the invention, the above and other objects are achieved by a windshield having an electrically conducting layer containing at least one slit whose length is a function of the wavelength of microwave radiation. This slit allows electromagnetic waves in the microwave range to pass through and be retransmitted.

The automobile window described in patent EP 0,332,898 B1 is an electrically heated window covered with a metal layer having low impedance, in which a slit plays the role of an antenna for frequency modulation radio wave reception. In this well known slotted antenna system, however, the electrically conducting layer is directly connected, relative to a midportion of the slit, to an internal conductor on one side and, on the other side, an external conductor of a coaxial cable which is connected to the receiver.

In contrast, the slot antenna of the invention does not provide a direct contact between the electrically conducting layer of the window and the transmitter and/or the receiver inside the vehicle. In this case, the retransmission of microwave energy is a simple effect of the radiation which, in turn, is received by the antenna of the receiving device. The window antenna naturally produces this effect in two directions, that is, at whatever side of the electrically isolated space where the receiver and the transmitter are located.

By microwaves we mean electromagnetic waves of a length less than 20 cm. Consequently, the length of the slot in the layer is between 0.2 and 10 cm; this length may be shortened as a function of the dielectric constant of the glass.

One will obtain the best results when the length of the wave by which the information is transmitted is fixed and by bringing the length of the slot to a resonant length of Lambda/2 as a function of the dielectric constant of the glass. By using a transmission frequency of 5.8 GHz, for example, which represents a wavelength of Lambda=52 mm, one will obtain a measurement of 18 mm as the ideal length of the slit.

The slit of the electrically conducting layer may have a width from 0.01 to 1 mm, preferably between 0.1 and 0.5 mm.

The slit can be mechanically produced by, for example, using a pointed tool, by micro-engraving by means of sand blasting or by thermal means, in particular by using a laser beam. By using a very narrow laser radiation beam, one can obtain slits of very narrow width, much less than 0.1 mm, for example, which are so thin that one can no longer distinguish them with the naked eye. The effect which the slit produces does not depend on its width.

If one uses linearly polarized microwaves, one or several rectilinear slits in the layer will suffice to make the layer sufficiently transparent for the microwave range. In order to obtain this effect, the rectilinear slit must be oriented in a direction perpendicular to the direction of the microwave polarization.

However, a simple rectilinear slit in the layer will not suffice for circularly polarized microwaves. In this case, in order to be able to produce all the effects of the invention, it will be necessary to have interruptions in the layer which are formed by two slits crossing one another, preferably at an angle of 90 degrees.

In principle, a single slit of this type can suffice to make the window sufficiently transparent to microwaves. In this case, the area of permeability, in other words the level of damping caused by the covered window, will depend on the place where the transmitting or receiving antenna is located relative to the slit which interrupts the layer. One can overcome this dependence and increase the permeability of the covered window by providing many slits which can be, for example, distributed over the entire surface of the window. One can also improve this permeability if each slit is distanced from the others by an interval of Lambda/2 of the wavelength used, taking into consideration the dielectric constant of the glass.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
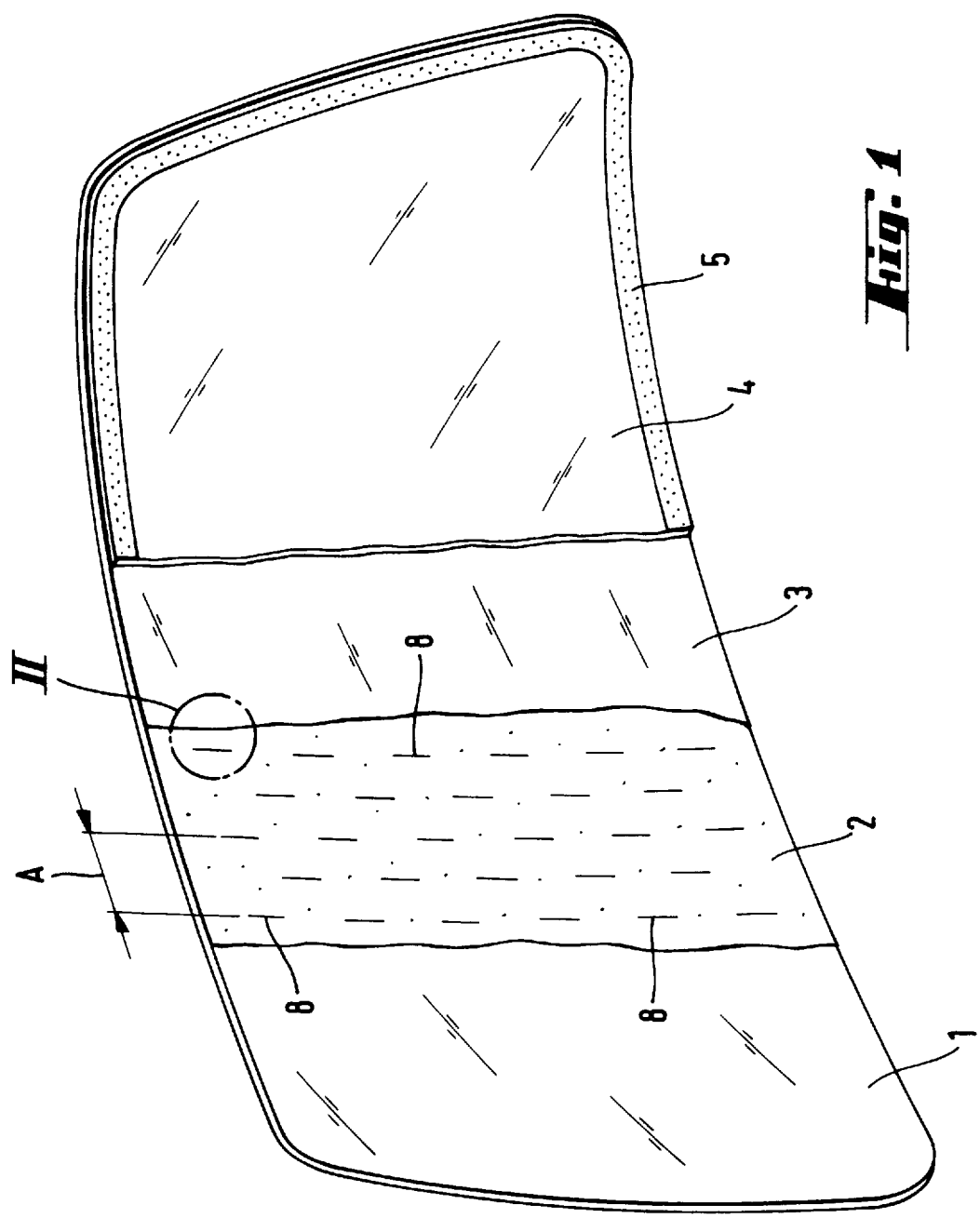
FIG. 1 is a perspective view, partly cut away, of a windshield of a passenger car in accordance with the invention.

The windshield is a laminated window comprised of a sheet of external glass (1) having a thickness of 3 mm, for example, a thermoplastic adhesive layer (3) of the polyvinyl butyryl type having a thickness of 0.76 mm, and a sheet of glass (4) which faces the inside of the vehicle and which is 2 mm thick, for example. The sheet of external glass (1) is connected to the internal sheet (3) which faces it by a thin transparent electrically conducting layer (2) which plays the role of a thermal protective layer because of its properties of reflecting infrared radiation. The external surface of the sheet of glass (4) which faces the inside of the vehicle is surrounded by a frame (5) which is covered by an opaque enamel paint; the latter provides, in particular, a protection for the glue layer, which holds the windshield to the body of the enclosure, against ultraviolet radiation and prevents one from seeing the glue layer from the outside.

Several layers, applied to the sheet of glass by, for example, by a process of cathodic spraying using magnetic fields, form the thin electrically conducting layer (2); the functional one of the layers is comprised of silver. The process of assembling these layers is already known. Such thin layers have a relatively small electrical resistance on the order of 3 to 100 ohms per surface unit area.

The thin layer (2) is provided with multiple vertical slits (8) which are distributed at regular intervals over one part or the entire surface of the layer (2). The slits (8) are made in the layer (2) by linearly hollowing out the layer using thermal or mechanical means. The use of a laser beam is particularly practical for the fabrication of the slits because it allows one to produce extraordinarily thin slits.

If the operating frequency for the transmission of information is 5.8 GHz, for example, as is provided for toll booth accounting along highways, and the slits (8) are designed to transmit microwaves at this frequency, the slit (8) will have a resonant length of Lambda/2, shortened by an amount considering the dielectric constant of the glass. For a frequency which corresponds to a wavelength of Lambda=52 mm, the length L of the slits (8) will be L=18 mm.

Figure 2:
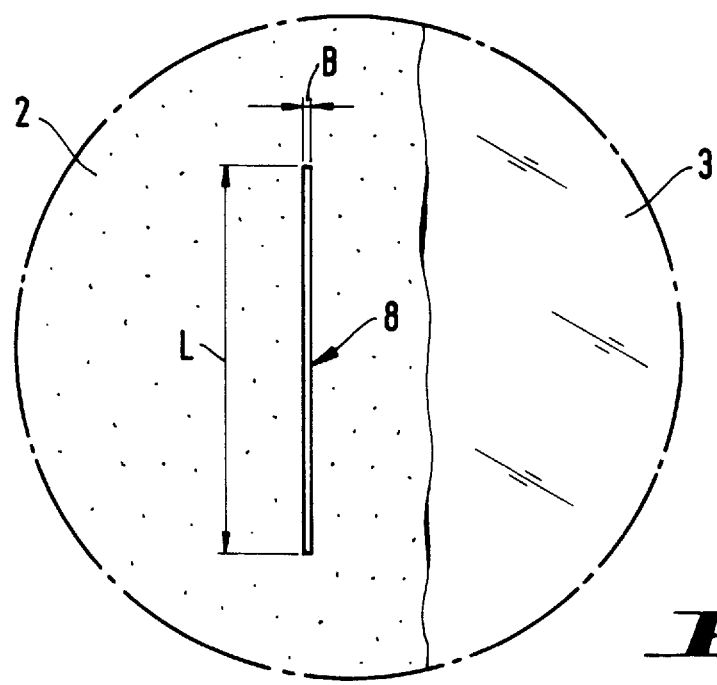
FIG. 2 is an enlargement of Part II of FIG. 1, showing a single slit.
Figure 3:
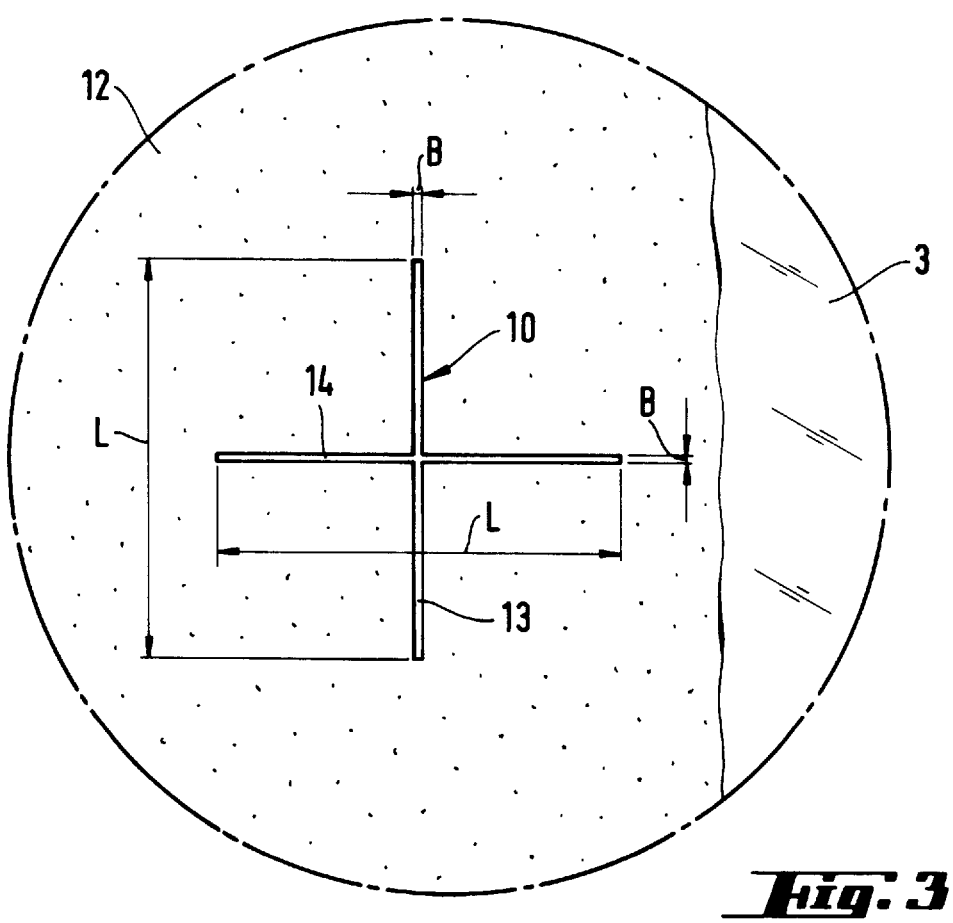
FIG. 3 is a view similar to that of FIG. 2 but showing a slit used in the case of circularly polarized microwaves.

If one compares the measurements of dampening of a microwave emission at the 5.8 GHz frequency on a laminated glass window that is not covered, a covered laminated window, and a laminated window provided with a slit of the type shown in FIG. 2, one will obtain the following values for the dampening:

uncovered laminated window: 2 to 7 dB covered laminated window: 20 to 40 dB laminated window with slots: 6 to 10 dB.

Compared to the dampening of an uncovered laminated window, the dampening of a covered window with slots is increased only slightly.

If the transmission of information is carried out by circularly polarized microwaves, slits in the form of crosses will be provided, as one can see on FIG. 2 which represents a detail of a slit in the form of a cross (10) in a thin layer (12). The cross-shaped slit (10) is formed by two straight slits (13) and (14) which cross at their central point at a right angle. The length L of the two slits (13, 14) is again a function of the wavelength of the microwaves used and corresponds, considering the dielectric constant of the glass, to the value Lambda/2 of the microwaves which are used.

Obviously, numerous modifications and variations of the present invention are possible in light of the above teachings. It is therefore to be understood that the invention may be practiced otherwise than as specifically described herein.

What is claimed as new and desired to be secured by Letters Patent of the United States is:

1. Window comprising at least one part of an enclosure within which an emitting or receiving antenna of microwave radiation is located, comprising:

a transparent glass layer;

a transparent electrically conducting layer formed on at least a portion of the transparent glass layer; and at least one slit formed in and completely surrounded by said electrically conducting layer, wherein a length of said slit is a function of a wavelength of microwave radiation to be directly received by or transmitted from said antenna via said electrically conducting layer having said at least one slit, said electrically conducting layer absorbing said microwave radiation for retransmission via said at least one slit, said electrically conducting layer only indirectly coupled to said antenna.

2. Window according to claim 1 wherein the length of the at least one slit is a resonant length of Lambda/2 of the microwave radiation, shortened as a function of a dielectric constant of the glass layer.

3. Window according to claim 2 wherein the length of the at least one slit is from 0.2 to 10 cm.

4. Window according to claim 1 wherein said at least one slit has a width from 0.01 to 1 mm.

5. Window according to claim 1 wherein said at least one slit has a width from 0.1 to 0.5 mm.

6. Window according to claim 1 wherein said at least one slit comprises two straight slits which cross one another at an angle of 90°.

7. Window according to claim 1 wherein said transparent electrically conducting layer has an electrical resistance from 3 to 100 ohms per unit of surface area.

8. Window according to claim 1 wherein the at least one slit comprises multiple distributed slits.

9. Window according to claim 8 wherein said multiple slits all have the same geometric measurement and are located at regular intervals of Lambda/2 of the microwave radiation shortened as a function of the dielectric constant of the glass layer.

* * * * *